United States Patent
Olbrisch et al.

(10) Patent No.: US 9,152,151 B2
(45) Date of Patent: Oct. 6, 2015

(54) IN-LINE BACK PRESSURE FLUID REGULATORS

(75) Inventors: Moritz Klaus Olbrisch, Hamburg (DE); Ruediger Niebel, Limburgerhof (DE); Falk Rapsch, Lubeck (DE)

(73) Assignee: TESCOM CORPORATION, Elk River, MN (US)

( * ) Notice: Subject to any disclaimer, the term of this patent is extended or adjusted under 35 U.S.C. 154(b) by 618 days.

(21) Appl. No.: 13/090,770

(22) Filed: Apr. 20, 2011

(65) Prior Publication Data
US 2012/0266980 A1    Oct. 25, 2012

(51) Int. Cl.
G05D 16/10    (2006.01)
E21B 34/10    (2006.01)
E21B 47/06    (2012.01)

(52) U.S. Cl.
CPC ............. *G05D 16/103* (2013.01); *E21B 34/10* (2013.01); *E21B 47/06* (2013.01); *Y10T 137/7835* (2015.04); *Y10T 137/7854* (2015.04); *Y10T 137/7922* (2015.04)

(58) Field of Classification Search
CPC ... G05D 16/10; G05D 16/103; G05D 16/106; F16K 31/363; F16K 17/06; Y10T 137/7835; Y10T 137/7854; Y10T 137/7922; E21B 34/10; E21B 47/06
USPC ............................ 137/509, 494, 510; 166/321
See application file for complete search history.

(56) References Cited

U.S. PATENT DOCUMENTS

| | | | |
|---|---|---|---|
| 2,301,031 A | 11/1942 | Ferguson | |
| 2,522,913 A | 9/1950 | Westman | |
| 2,612,728 A | 10/1952 | Jacobsson | |
| 2,731,981 A * | 1/1956 | Glasser | 137/536 |
| 2,742,764 A | 4/1956 | St. Clair | |
| 2,783,769 A | 3/1957 | Philbrick | |
| 2,806,481 A | 9/1957 | Faust | |
| 2,886,058 A * | 5/1959 | Horton | 137/484.2 |
| 3,153,424 A * | 10/1964 | Acker et al. | 137/505.41 |
| 3,196,901 A | 7/1965 | Phillipps | |

(Continued)

FOREIGN PATENT DOCUMENTS

| | | |
|---|---|---|
| DE | 2510235 | 9/1976 |
| FR | 1263971 | 6/1961 |

(Continued)

OTHER PUBLICATIONS

TESCOM, "26-1700 Series," published Mar. 2007, 2 pages.

(Continued)

*Primary Examiner* — William McCalister
(74) *Attorney, Agent, or Firm* — Hanley, Flight & Zimmerman, LLC

(57) ABSTRACT

In-line back pressure fluid regulators are described. An example in-line fluid regulator includes a regulator body defining a sensing chamber and an outlet of a fluid flow path of the fluid regulator. The outlet is in fluid communication with the sensing chamber via a first flow passageway in the regulator body. A bonnet is coupled to the regulator body and defines an inlet of the fluid flow path and a loading chamber disposed between the sensing chamber and the inlet. The loading chamber is substantially sealed relative to the fluid flow path of the fluid regulator. A pressure sensor is disposed between the inlet and the sensing chamber, where the pressure sensor defines a second flow passageway to fluidly couple the inlet and the sensing chamber.

31 Claims, 9 Drawing Sheets

(56) References Cited

U.S. PATENT DOCUMENTS

| | | | |
|---|---|---|---|
| 3,272,224 A | 9/1966 | Wrenshall | |
| 3,338,638 A * | 8/1967 | Kirk et al. | 303/22.2 |
| 3,542,052 A | 11/1970 | Irwin | |
| 3,621,872 A | 11/1971 | Fisher | |
| 3,658,082 A | 4/1972 | DiTirro | |
| 3,757,816 A | 9/1973 | Price | |
| 3,906,982 A | 9/1975 | Fleischhacker et al. | |
| 3,926,204 A | 12/1975 | Earl | |
| 4,072,165 A * | 2/1978 | Bradley, Jr. | 137/493 |
| 4,111,222 A | 9/1978 | Hassell | |
| 4,274,490 A * | 6/1981 | Huckaby | 166/325 |
| 4,497,440 A * | 2/1985 | Galloway | 239/201 |
| 4,596,264 A | 6/1986 | Gladstone et al. | |
| 4,611,627 A | 9/1986 | Eidsvoog et al. | |
| 4,664,151 A | 5/1987 | Piet | |
| 4,693,267 A | 9/1987 | Patterson | |
| 4,909,269 A | 3/1990 | Pritchard et al. | |
| 5,129,551 A * | 7/1992 | Gott | 222/135 |
| 7,357,151 B2 * | 4/2008 | Lonnes | 137/509 |
| 2010/0276614 A1 | 11/2010 | Patterson et al. | |
| 2013/0000917 A1 * | 1/2013 | Slack et al. | 166/321 |
| 2013/0037130 A1 | 2/2013 | Olbrisch et al. | |

FOREIGN PATENT DOCUMENTS

| | | |
|---|---|---|
| FR | 2305667 | 10/1976 |
| GB | 649478 | 1/1951 |
| GB | 2308425 | 6/1997 |

OTHER PUBLICATIONS

TESCOM, "Pressure Reducer Series 26-1700," instructions for use, published Jul. 2008, 6 pages.

Imbo et al., Innovative Capillary Deliquification Safety System Resolves Liquid Loading Problems with a Cost-Effective Solution that Maximizes Production While Maintaining Well-Safety Requirements, SPE International, © 2010, 12 pages.

International Searching Authority, "International Search Report," issued in connection with international application serial No. PCT/US2012/030793, mailed Jun. 29, 2012, 2 pages.

International Searching Authority, "Written Opinion of the International Searching Authority," issued in connection with international application serial No. PCT/US2012/030793, mailed Jun. 29, 2012, 7 pages.

Halliburton, "Tubing-Retrievable Subsurface Safety Valves," copyrighted 2008, 27 pages.

The United States Patent and Trademark Office, "Non-Final Office Action," issued in connection with U.S. Appl. No. 13/207,186, mailed on Dec. 27, 2013, 16 pages.

The United States Patent and Trademark Office, "Final Office Action," issued in connection with U.S. Appl. No. 13/207,186, mailed Jun. 27, 2014, 23 pages.

United States Patent and Trademark Office, "Office Action", issued in connection with U.S. Appl. No. 13/207,186, mailed on Dec. 10, 2014, 25 pages.

International Searching Authority, "International Search Report", issued in connection with PCT Application No. PCT/US2012/049687, mailed on Oct. 5, 2010, 3 pages.

International Searching Authority, "Written Opinion", issued in connection with PCT Application No. PCT/US2012/049687, mailed on Oct. 5, 2010, 6 pages.

International Searching Authority, "International Preliminary Report on Patentability", issued in connection with PCT Application No. PCT/US2012/049687, mailed on Feb. 11, 2014, 7 pages.

United States Patent and Trademark Office, "Notice of Allowance," issued in connection with U.S. Appl. No. 13/207,186, on May 1, 2015, 18 pages.

Mexican Patent Office, "Office Action," issued in connection with Mexican Patent Application No. MX/a/2014/001518, issued on Jan. 16, 2015, 4 pages.

* cited by examiner

IN-LINE BACK PRESSURE FLUID REGULATORS

FIELD OF THE DISCLOSURE

The present disclose relates generally to fluid regulators and, more particularly, to in-line back pressure fluid regulators.

BACKGROUND

Process control systems commonly employ pressure regulators (e.g., back-pressure regulators) to control or maintain a pressure of a process fluid to protect instruments or other control devices that are sensitive to high pressures. Fluid regulators such as, for example, back-pressure regulators typically include a fluid valve assembly having a pressure sensor such as a piston to sense the pressure of a pressurized fluid at an inlet of the regulator. When the pressure of the pressurized fluid at the inlet exceeds a reference or set-point pressure (e.g., provided by the fluid regulator), the pressure sensor causes a flow control member of the fluid valve to open to allow fluid flow through the regulator body between the inlet and an outlet, which may be coupled to a lower pressure system utilizing the fluid or to the atmosphere.

However, space limitations or constraints may limit the use of back pressure regulators in some applications. For example, in a gas exploration application, a tubing having, for example, a diameter of approximately 2 to 2½ inches is typically used to extract the fluid from a well. The tubing is too small to receive a conventional back pressure regulator coupled to an agent injection feed line that is disposed within the tubing.

SUMMARY

Figure 1:
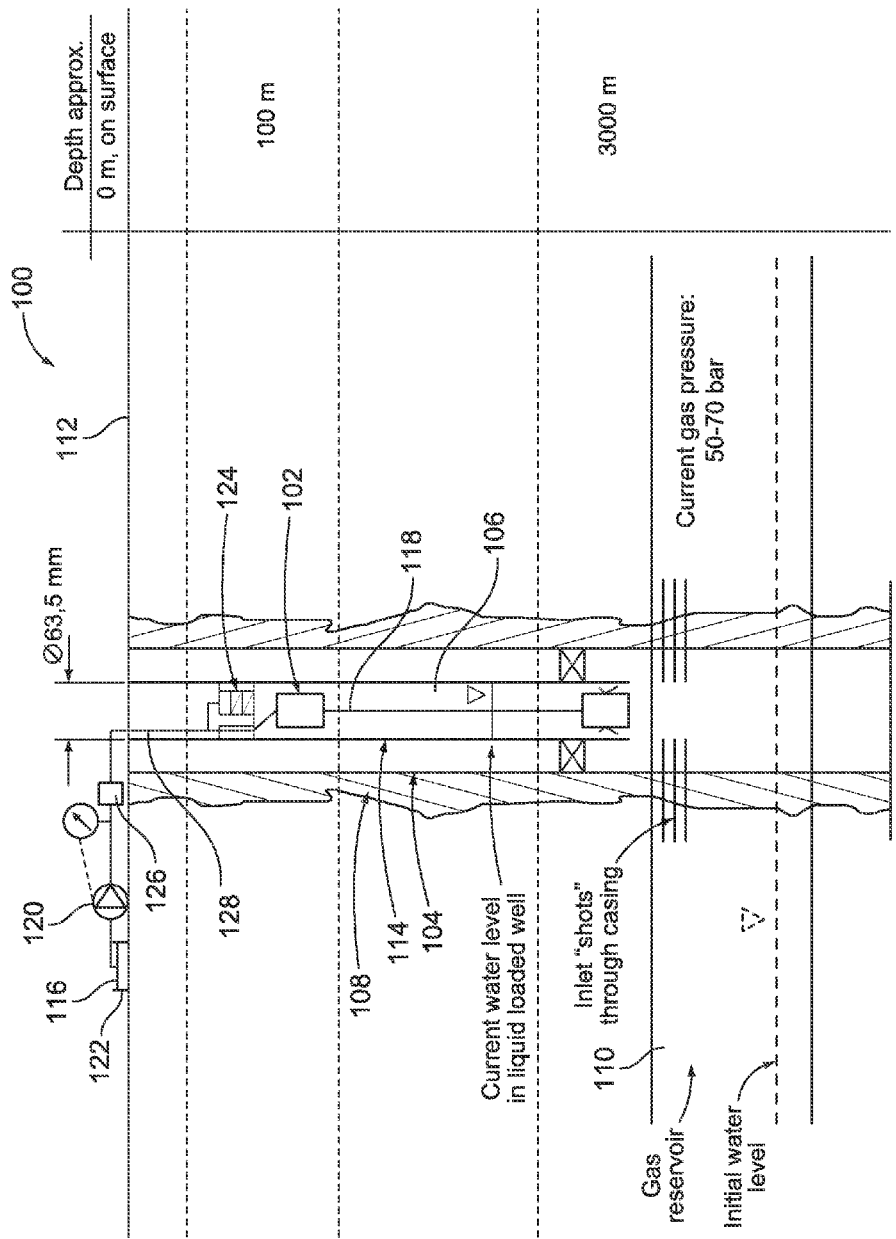
FIG. 1 illustrates a schematic gas exploration application having a known pressure relief valve coupled to an agent injection feed line.

Example in-line back pressure fluid regulators described herein sense a pressure of a fluid upstream from the fluid regulator. The fluid regulators described herein move between an open position to allow fluid flow through the fluid regulator between an inlet and an outlet and a closed position to prevent fluid flow through the fluid regulator based on a sensed pressure upstream of the process fluid upstream of the inlet. For example, when the pressure of the process fluid upstream of the fluid regulator falls below a reference pressure of the fluid regulator (e.g., provided by a loading apparatus), the fluid regulator moves to a closed position.

An example in-line fluid regulator described herein includes a body or housing defining a fluid flow passageway between an inlet and an outlet. In some examples, the housing includes a regulator body that defines a sensing chamber, an outlet of a fluid flow path of the fluid regulator, and a first flow passageway in the regulator body. A bonnet is coupled to the regulator body and defines an inlet of the fluid flow path and a loading chamber disposed between the sensing chamber and the inlet. In other words, the loading chamber is formed within the housing between the inlet and the outlet and aligned with the fluid flow passageway. A loading apparatus or member such as, for example, a biasing element or a control fluid provides a pressure reference. Additionally, the loading chamber is substantially sealed relative to the fluid flow path of the fluid regulator.

A pressure sensor is disposed within the fluid flow passageway and has an aperture to fluidly couple the inlet and the outlet. In some examples, the pressure sensor is disposed between the inlet and the sensing chamber, where the pressure sensor defines a second flow passageway to fluidly couple the inlet and the sensing chamber. In some examples, the pressure sensor at least partially extends into the loading chamber and has a first seal disposed adjacent a first end of the loading chamber to prevent fluid flow between the inlet and the loading chamber and a second seal disposed adjacent a second end of the loading chamber to prevent fluid flow between the loading chamber and the outlet.

DETAILED DESCRIPTION

The example in-line back pressure fluid regulators described herein have a housing that defines a substantially straight or linear fluid flow path between an inlet and an outlet. More specifically, the example back pressure fluid regulators may be coupled in-line relative to a flow path of a process fluid system. For example, an inlet, an outlet, a flow control member, a loading chamber and a sensing chamber of an example fluid regulator described herein are co-axially aligned to define a substantially straight or linear fluid flow path of the back pressure fluid regulator. As a result, the example back pressure fluid regulators described herein provide a substantially smaller or reduced envelope or footprint compared to conventional back pressure fluid regulators. Thus, the example back pressure fluid regulators described herein may be advantageously used with applications having relatively small or tight space constraints (e.g., a well exploration application). Further, the example back pressure fluid regulators described herein isolate or seal a loading chamber from a surrounding environment and/or the fluid flow path of the fluid regulator such that pressure fluctuations in the surrounding environment do not affect a desired pre-set load of the back pressure regulator.

In particular, an example back pressure regulator described herein provides a cylindrical body or housing having a fluid flow passageway that is substantially aligned (e.g., coaxially aligned) with an inlet and an outlet of the regulator. The housing defines a loading chamber and a sensing chamber disposed between the inlet and the outlet. In some examples, the loading chamber and the sensing chamber are substantially coaxially aligned with the inlet and the outlet and the fluid flow passageway. A pressure sensor or stem is disposed within the housing and includes an opening to define a portion of the fluid flow passageway. The pressure sensor and the housing seal or isolate the loading chamber from the fluid flow passageway. In this manner, a loading apparatus that provides a pre-set pressure reference to the pressure sensor is not influenced or affected by pressure fluctuations of a process fluid in the fluid flow passageway and/or pressure fluctuations of the environment surrounding the back pressure regulator.

FIG. 1 is a schematic illustration of a hydrocarbon application 100 (e.g., a gas/oil well exploration application) having a conventional or known pressure relief valve 102. A casing 104 is secured within a well 106 by cement 108 and extends in the well to a gas/oil reservoir 110 below the Earth's surface 112 (e.g., 300 meters below the Earth's surface 112). The casing 104 facilitates access to the reservoir 110 and enables a pipe or tubing 114 to be disposed within the well 106 to fluidly couple the reservoir 110 to the surface 112. The gas travels from the reservoir 110 to the Earth's surface 112 via the tubing 114, which may have, for example, a diameter of about 2 inches. A process fluid 116 (e.g., a foaming agent) may be injected within the tubing 114 via a process fluid line 118 to reduce an amount of water within the reservoir 110 and increase a fluid flow rate of the gas to the Earth's surface 112. As shown, the process fluid line 118 is disposed inside of the tubing 114. Thus, the relief valve 102 must be dimensioned to fit inside the tubing 114 (i.e., to fit within a cylindrical space having a diameter of about 2 inches). A pump 120 pumps the process fluid 116 from a tank 122 to the reservoir 110 via the process fluid line 118.

The application 100 includes a Surface-controlled Subsurface Safety Valve 124 (ScSSV) to isolate wellbore pressures and fluids and prevent oil/gas flow through the tubing 114 and to the surface 112 in the event of a system failure. The ScSSV 124 is a fail-to-close valve and is moved to an open position by a pressure of the pressurized fluid 116 in the process fluid line 118.

The known relief valve 102 receives pressurized process fluid upstream from the relief valve 102 and moves to an open position to allow fluid flow through the relief valve 102 when the pressure of the fluid upstream of the relief valve 102 is greater than a reference pressure of the relief valve 102 (e.g., a pre-set load). The relief valve 102 moves to a closed position to prevent fluid flow through the relief valve 102 when the upstream pressure is less than the reference pressure of the relief valve 102. Thus, when the pump 120 is deactivated, for example during maintenance, the relief valve 102 moves to a closed position. A valve 126 downstream of the pump 120 may be moved to a closed position to trap pressurized fluid within a portion 128 of the process fluid line 118 between the relief valve 102 and the valve 126 such that the pressure to the ScSSV 124 is sufficient to prevent activation of the ScSSV 124.

However, during operation, pressure fluctuations within the process fluid line 118 causes a valve plug (e.g., a ball valve) of the relief valve 102 to move rapidly relative to a valve seat, which may cause damage to the valve plug and/or the valve seat. In particular, the valve plug and/or valve seat are often composed of tungsten carbide material due to erosive conditions of the process fluid 116. Further, the relief valve 102 includes a unitary flow control member (e.g., ball valve) and stem. As a result, the load imparted to the stem of the flow control member by a loading element (e.g., a load spring) and/or any pressure fluctuations is fully transferred or imparted to the flow control member and/or the valve seat during operation. However, tungsten carbide material is often brittle and may cause the valve seat and/or valve plug may become damaged during operation when relief valve 102 is exposed to significant pressure fluctuations. As a result, a damaged valve plug and/or valve seat may provide an inadequate seal to maintain the pressure of the pressurized fluid in the portion 128 of the process fluid line 118, which may cause activation of the ScSSV 124 during a non-failure state or condition.

Figure 2:
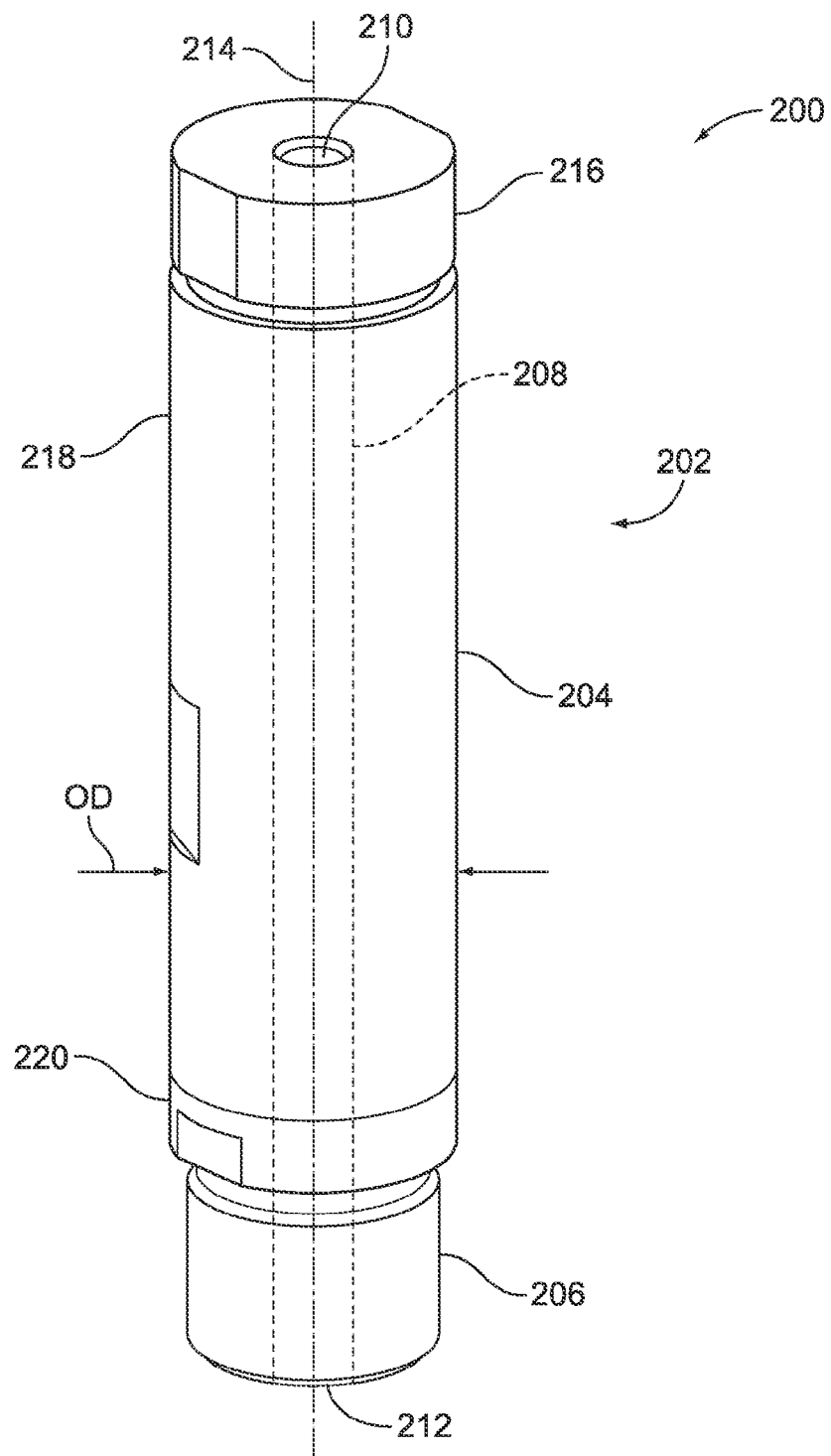
FIG. 2 depicts of an example back pressure regulator described herein that may be used with the gas exploration application of FIG. 1.

FIG. 2 depicts an example in-line back pressure fluid regulator 200 described herein that can be used with, for example, the application 100 of FIG. 1, in place of the conventional pressure relief valve 102. The example fluid regulator 200 may be used, for example, to maintain a control pressure of pressure system upstream from the fluid regulator 200 such as, for example, the portion 128 of the process fluid line 118 of FIG. 1, provide a shut-off mechanism when a pressure of a precise or controlled pressurized fluid system upstream from the fluid regulator 200 falls below a pre-set reference pressure or threshold value, etc.

The example regulator 200 shown in FIG. 2 provides an in-line flow path configuration to regulate a pressure of a pressurized fluid or system upstream of the fluid regulator 200. The example fluid regulator 200 includes a housing 202 having an upper body portion or bonnet 204 coupled (e.g., threadably coupled) to a lower body portion or regulator body 206 to form a fluid flow path 208 between an inlet 210 and an outlet 212 of the fluid regulator 200. In particular, the bonnet 204 defines the inlet 210 and the regulator body 206 defines the outlet 212. In this example, the fluid flow path 208 is a substantially straight or linear flow path that is coaxially aligned with the inlet 210 and the outlet 212 and a longitudinal axis 214 of the housing 202. The inlet 210 may be fluidly coupled to a high pressure source upstream of the fluid regulator 200 (e.g., the pump side of the process fluid line 118 of FIG. 1) and the outlet 212 may be fluidly coupled to a low pressure system or source downstream from fluid regulator 200 (e.g., to an outlet of the process fluid line 118 fluidly coupled to the reservoir 110 of FIG. 1). In other examples, the outlet 212 may be fluidly coupled another downstream back pressure fluid regulator, a valve, or any other downstream source. As shown, a coupling 216 may be optionally coupled (e.g., threadably coupled) to the inlet 210 of the bonnet 204 to enable the bonnet 204 to receive different sized piping, tubing, etc.

In the illustrated example, the housing 202 has a cylindrical shape or profile when the regulator body 206 is coupled to the bonnet 204 that has an outer diameter OD of, for example, less than two inches. However, in other examples, the fluid regulator 200 may have any other suitable shape such as, for example, a rectangular shape, a square shape, etc. Also, an outermost surface 218 of the bonnet 204 and an outermost surface 220 of the regulator body 206 are substantially flush when the regulator body 206 is coupled to the bonnet 204.

Figure 3:
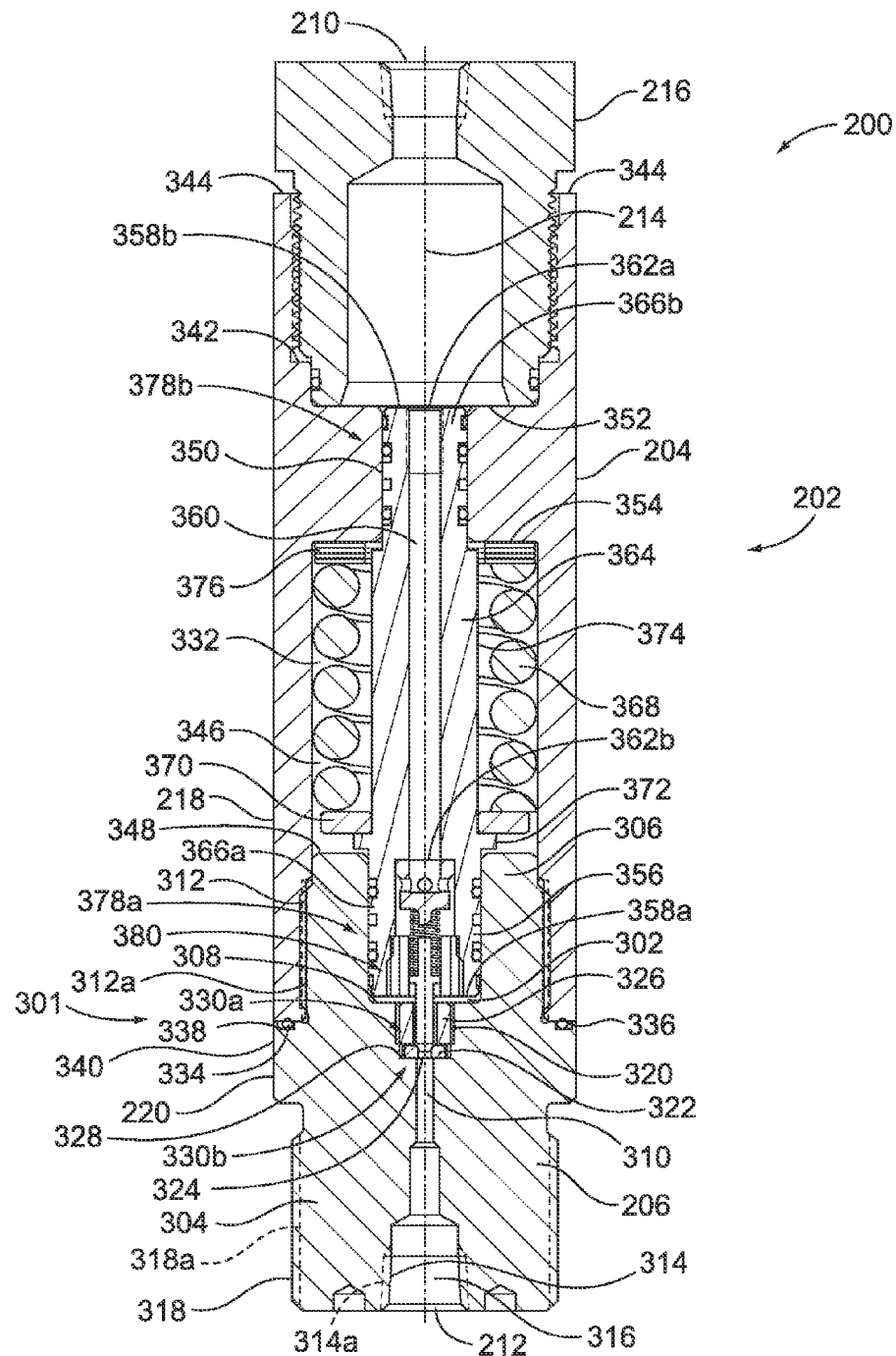
FIG. 3 is a cross-sectional view of the example back pressure regulator of FIG. 2.

FIG. 3 is a cross-sectional view of the example fluid regulator 200 of FIG. 2. Referring to FIG. 3, the bonnet 204 is coupled (e.g., threadably coupled) to the regulator body 206 at a bonnet/regulator body interface 301.

The regulator body 206 defines a sensing chamber 302 and the outlet 212 of the fluid flow path 208. In the illustrated example, the regulator body 206 is a cylindrical body or cylinder 304 having an annular wall 306 that defines a cavity 308 to at least partially define the sensing chamber 302. The regulator body 206 defines a flow passageway 310 (e.g., a substantially linear passageway) that defines a portion of the fluid flow path 208 and fluidly couples the sensing chamber 302 and the outlet 212. An outer surface 312 of the annular wall 306 includes threads 312a to couple the regulator body 206 to the bonnet 204. Also, an inner wall 314 of a port 316 adjacent the outlet 212 may include threads 314a and/or an outer surface 318 of the regulator body 206 adjacent the outlet 212 (i.e., opposite the annular wall 306) may include threads 318a to couple the regulator body 206 to a downstream pressure source or system, tubing, piping, etc.

The regulator body 206 includes a recess or bore 320 between the flow passageway 310 and the sensing chamber 302 to receive a valve seat 322 that defines an orifice 324 of the fluid flow path 208. A seat retainer 326 is disposed (e.g., threadably coupled) in the recess 320 to retain or capture the valve seat 322 within the recess 320 between a shoulder 328 of the recess 320 and the seat retainer 326. An inlet side 330a of the valve seat 322 is in fluid communication with the sensing chamber 302 and an outlet side 330b of the valve seat 322 is in fluid communication with the flow passageway 310.

As shown, the outlet 212, the orifice 324, the sensing chamber 302 and the flow passageway 310 are substantially aligned (e.g., coaxially aligned) with the axis 214 and define a portion of the fluid flow path 208 of the fluid regulator 200. In other examples, the flow passageway 310 may be a non-linear flow passageway and/or may not be aligned (e.g., coaxially aligned) with the outlet 212, the sensing chamber 302 and/or the axis 214.

The bonnet 204 of the illustrated example defines the inlet 210 of the fluid flow path 208. When coupled to the regulator body 206, the bonnet 204 and the regulator body 206 define a loading chamber 332 disposed between the inlet 210 and the sensing chamber 302. To prevent fluid leakage within the loading chamber 332 via the regulator body/bonnet interface 301, the fluid regulator 200 of the illustrated example includes a seal 334 disposed between an end 336 of the bonnet 204 and a recess 338 (e.g., an annular recess) formed on an upper surface of a flange 340 of the regulator body 206. The flange 340 is disposed between the cylindrical body 304 and the annular wall 306 and defines the outermost surface 220 that is substantially flush with the outer surface 218 of the bonnet 204.

The bonnet 204 of the illustrated example is cylinder having a first cavity 342 defining the inlet 210 that opens toward an end 344 of the bonnet 204 and a second cavity 346 that opens toward the end 336 of the bonnet 204. As shown, the bonnet 204 couples to the annular wall 306 of the regulator body 206 and the first cavity 342 receives the coupling 216. When coupled to the regulator body 206, the annular wall 306 extends into the second cavity 346 such that an end or upper surface 348 of the annular wall 306 and the second cavity 346 define the loading chamber 332. As shown, the loading chamber 332 is disposed between the sensing chamber 302 and the inlet 210.

The bonnet 204 includes a bore 350 between the first cavity 342 and the second cavity 346. The bore 350 has a diameter or reduced portion that is less than a diameter of the first cavity 342 and a diameter of the second cavity 346. The bore 350 and the first cavity 342 define a first shoulder 352 adjacent the inlet 210, and the bore 350 and the second cavity 346 define a second shoulder 354 adjacent the loading chamber 332. As shown, the bore 350 is a substantially straight opening coaxially aligned with the axis 214 of the fluid regulator 200. However, in other examples, the bore 350 may be tapered, have a square or rectangular profile, and/or may be non-parallel and/or non-coaxial relative to the axis 214.

To sense a pressure of a process fluid within the sensing chamber 302, the fluid regulator 200 of the illustrated example employs a pressure sensor 356. The pressure sensor 356 includes a pressure sensing face or surface 358a (e.g., an area) and a second pressure sensing face or surface 358b that are both substantially perpendicular to the axis 214. In this example, the pressure sensor 356 is disposed within the fluid flow path 208 between the inlet 210 and the outlet 212. In particular, the pressure sensor 356 has a pressure sensor passageway 360 substantially parallel and coaxially aligned with the axis 214 that extends through the pressure sensor 356 between a first end 362a adjacent the inlet 210 or the pressure sensing surface 358b and a second end 362b adjacent the first sensing surface 358a and in fluid communication with the sensing chamber 302.

In the illustrated example, the pressure sensor 356 is a cylindrical, elongate body or stem 364 having a first stem end 366a defining a first piston head and the sensing surface 358a and a second stem end 366b defining the second sensing surface 358b disposed within the bore 350 of the bonnet 204. As shown, the stem 364 of the pressure sensor 356 extends through at least a portion of the loading chamber 332. In other words, the loading chamber 332 surrounds or encases at least the stem 364 between the first and second stem ends 366a and 366b. The first stem end 366a slides or moves within the sensing chamber 302 and the second stem end 366b slides or moves within the bore 350. In this example, the second stem end 366b has a reduced profile or diameter relative to the first stem end 366a such that the first sensing surface 358a has a larger area than the second sensing surface 358b. Thus, the difference in areas of the first and second sensing surfaces 358a and 358b provides an effective sensing area of the fluid regulator 200.

To provide a pre-set load to the pressure sensor 356, a biasing element 368 is disposed within the loading chamber 332. In particular, the biasing element 368 is disposed in the loading chamber 332 between the shoulder 354 and a spring seat or shim 370. To transfer the load imparted by the biasing element 368 to the pressure sensor 356, the pressure sensor 356 includes a flange or lip portion 372 (e.g., an annular lip) disposed along an outer surface 374 of the pressure sensor 356. As shown, the lip portion 372 is disposed between the spring seat 370 and the upper surface 348 of the annular wall 306. To provide a desired pre-set load or cracking pressure (a pressure which causes the fluid regulator 200 to first move to an open position to allow fluid flow through the fluid flow path 208), one or more shims 376 may be disposed between the shoulder 354 and the biasing element 368 to affect or change a compression of the biasing element 368. In the illustrated example, the shims 376 may be metallic washers, Bellville springs, etc. For example, the shims 376 may be factory installed during assembly of the fluid regulator 200. Alternatively, one or more shims (not shown) may be disposed between the biasing element 368 and the spring seat 370. As described in greater detail below in connection with FIGS. 5A, 5B, 6A and 6B, other example fluid regulators described herein may include an adjustor to enable adjustment of the pre-set load in the field.

The loading chamber 332 is isolated or sealed from the fluid flow path 208 and/or environmental conditions external to the fluid regulator 200 (e.g., external fluid pressures). In this manner, for example, pressure fluctuations in the fluid flow path 208 and/or environmental pressure fluctuations to do not affect the pre-set load provided to the pressure sensor 356 by the biasing element 368. In other words, pressure fluctuations of the fluid flowing through the fluid flow path 208 and/or pressure conditions in the environment in which the fluid regulator 200 is used will not cause or impart a force to the pressure sensor 356 via the loading chamber 332 that would otherwise increase the pre-set load (e.g., a factory provided pre-set load) provided by the biasing element 368. To isolate or seal the loading chamber 332 from the fluid flow path 208 or the environment, the first stem end 366a has a seal assembly 378a to prevent fluid leakage or fluid flow between the sensing chamber 302 and the loading chamber 332 and the second stem end 366b includes a seal assembly 378b to prevent fluid leakage or flow between the inlet 210 and the loading chamber 332 via the bore 350.

Although not shown, in other examples, loading to the pressure sensor may be provided via a control fluid (e.g., hydraulic oil, pneumatic). For example, the end 344 and/or the surface 218 of the bonnet 204 may include a loading fluid passageway or port to fluidly couple a control fluid to the loading chamber 332. In this example, the loading fluid passageway may be adjacent the inlet 210 and the flow passageway 360, but is not in fluid communication with the fluid flow path 208. The loading fluid passageway may be substantially parallel to the fluid flow path 208 and spaced a distance from the fluid flow path 208 and/or may be non-parallel relative to the fluid flow path 208 or axis 214.

To control fluid flow through the fluid regulator 200, a flow control assembly 380 is coupled to the pressure sensor 356. In particular, the pressure sensor 356 moves the flow control assembly 380 relative to the valve seat 322.

Figure 4A:
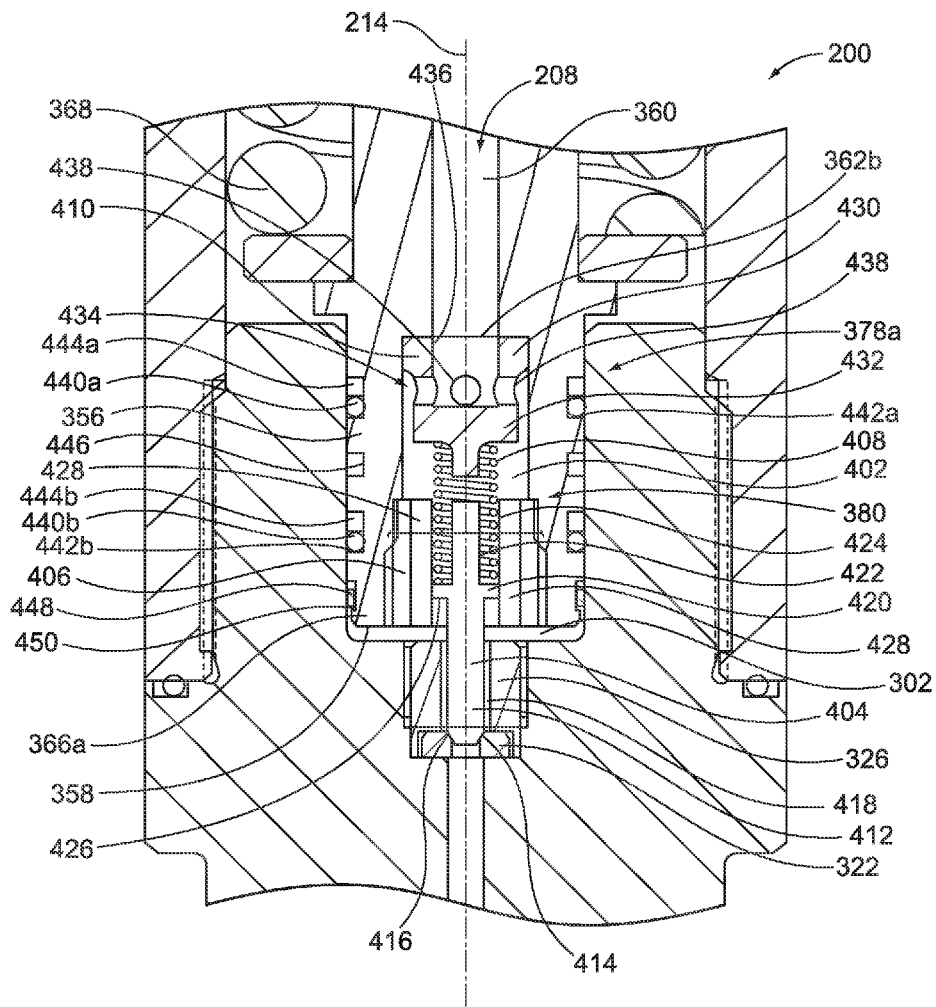
FIG. 4A is an enlarged cross-sectional view of a portion of the example back pressure regulator of FIGS. 2 and 3.

FIG. 4A is an enlarged portion of the cross-sectional view of the fluid regulator 200 of FIG. 3. As most clearly shown in FIG. 4A, the pressure sensor 356 includes an opening or retainer cavity 402 adjacent the sensing surface 358a to receive the flow control assembly 380. The flow control assembly 380 includes a flow control member or poppet 404, a retainer 406, a biasing element 408 and a stem guide 410.

In this example, the flow control member 404 has a pin, plunger, or cylindrical body portion 412 having a tapered seating surface 414 that sealingly engages a sealing surface 416 of the valve seat 322 to prevent or restrict fluid flow through the fluid flow path 208 when the fluid regulator 200 is in a closed position as shown in FIG. 4A. The body portion 412 has an outer diameter to move or slide relative to an opening 418 of the valve seat retainer 326. The flow control member 404 also includes a lip or flange 420 adjacent a stem portion 422.

The retainer 406 is coupled to the retainer cavity 402 via, for example, threads and retains the flow control member 404, the biasing element 408 and the stem guide 410 within the retainer cavity 402. In this example, the retainer 406 defines at least a portion of the sensing surface 358a when coupled to the pressure sensor 356. The retainer 406 is a cylindrical body having an aperture 424 to slidably receive the flow control member 404 such that the flow control member 404 is coaxially aligned with the fluid flow path 208 or the axis 214. As shown, the aperture 424 defines a stepped portion or shoulder 426 within the aperture 424. When coupled to the retainer 406, the lip 420 of the flow control member 404 engages the shoulder 426 in the aperture 424 of the retainer 406 to prevent further movement of the flow control member 404 toward the valve seat 322 in a direction parallel to the axis 214. The retainer 406 also includes one or more passageways 428 (e.g., parallel to the axis 214) to fluidly couple the retainer cavity 402 and the sensing chamber 302.

The biasing element 408 has a spring rate that is significantly less than the spring rate of the biasing element 368 and biases the lip 420 toward the shoulder 426. As shown, the biasing element 408 is disposed between the lip 420 and the stem guide 410 such that the biasing element 408 surrounds or is coaxially aligned with the stem portion 422 of the flow control member 404.

The stem guide 410 of the illustrated example includes a fluid flow guide portion 430 and a spring seat portion 432. As shown, the stem guide 410 is a cylindrical body such that the spring seat portion 432 has a diameter or profile (e.g., a tapered profile) that is smaller than the profile or diameter of the fluid flow guide portion 430. In this manner, a gap 434 is formed between the between the spring seat portion 432 and an inner surface or wall of the retainer cavity 402. The stem guide 410 includes an opening 436 between the flow guide portion 430 and the spring seat portion 432 that is parallel to the axis 214 and one or more openings 438 substantially perpendicular to the axis 214 that intersect the opening 436 to fluidly couple the second end 362b of the pressure sensor passageway 360 and the retainer cavity 402. More specifically, as fluid flows through the pressure sensor passageway 360 and to the retainer cavity 402, the fluid flows through the gap 434 and around the spring seat portion 432 such that the stem guide 410 diverts or directs the fluid flow toward the retainer 406 and away from the biasing element 408.

As most clearly shown in FIG. 4A, the seal assembly 378a includes one or more seals 440a-b (e.g., O-rings) disposed within respective recesses or grooves 442a-b of the first stem end 366a. Each of the seals 440a-b may include retaining rings 444a-b (e.g., a piston ring) to retain the seals 440a-b within their respective grooves 442a-b. The seal 440a provides a backup seal should the seal 440b fail during operation. An annular or reservoir groove 446 may be formed on the stem end 366a between the seals 440a-b. In this manner, if fluid leaks past the seal 440b, the fluid can accumulate in the reservoir groove 446 to delay a build-up of pressure against the seal 440a. Additionally, to reduce friction between the first stem end 366a and an inner surface of the pressure sensing chamber 302, the seal assembly 378a includes a wear ring 448 disposed within a groove 450.

Figure 4B:
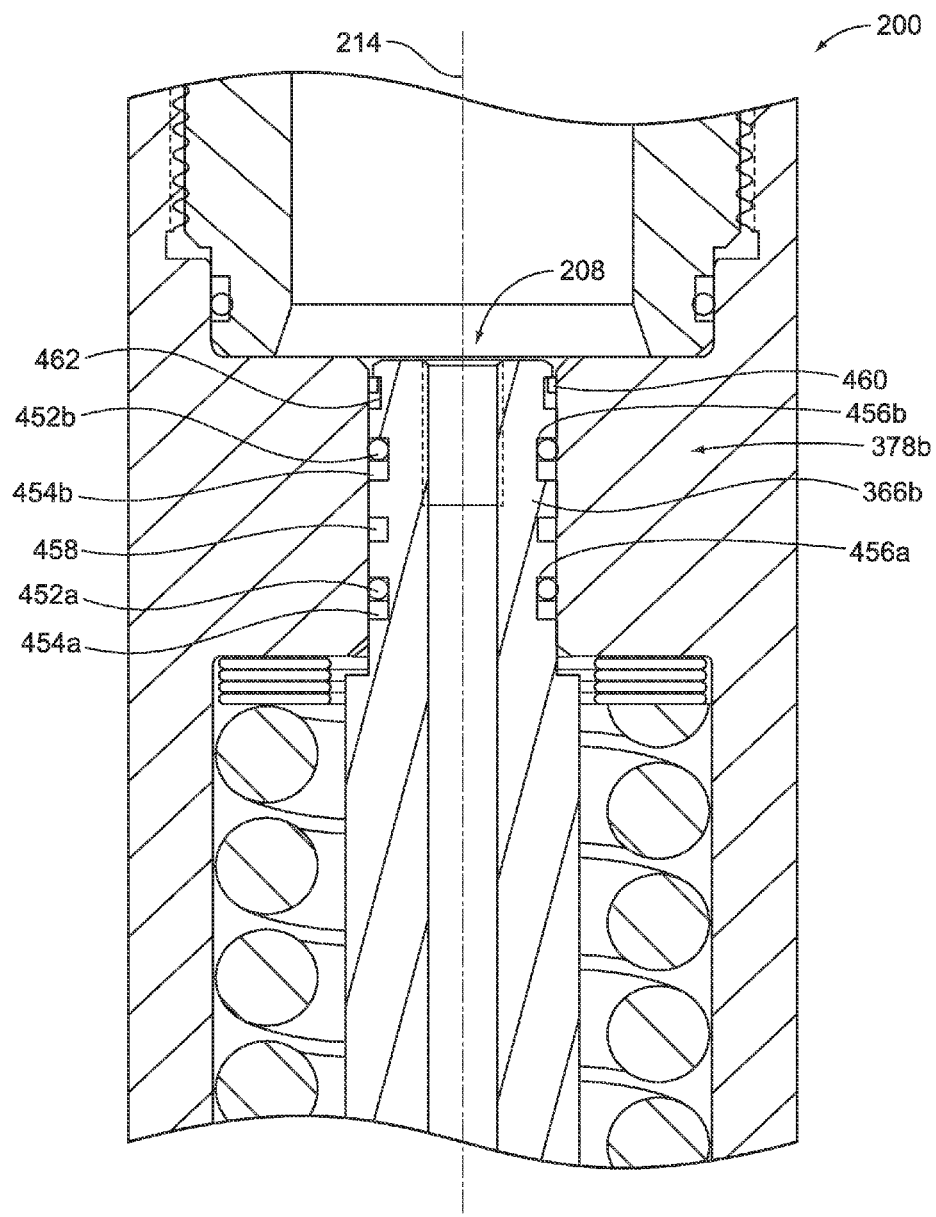
FIG. 4B is another enlarged cross-sectional view of another portion of the example back pressure regulator of FIGS. 2 and 3.

FIG. 4B is an enlarged portion of the example fluid regulator of FIG. 3. Similar to the seal assembly 378a, the seal assembly 378b at the second stem end 366b includes one or more seals 452a-b (e.g., O-rings) and retaining rings 454a-b disposed within respective grooves 456a-b of the second stem end 366b, a reservoir groove 458, and a wear ring 460 disposed within a groove 462.

In operation, a high pressure fluid source fluidly coupled to the inlet 210 provides pressurized fluid to the sensing chamber 302. In particular, the pressurized fluid flows in the fluid flow path 208 of the fluid regulator 200 from the inlet 210, through the pressure sensor passageway 360, and to the sensing chamber 302 via the passageways 436 and 438 and the retainer passageways 428. As noted above, the stem guide 410 directs the fluid flow through the gap 434 and away from the biasing element 408 toward the retainer passageways 428.

The sensing surface 358a of the pressure sensor 356 senses the pressure of the pressurized fluid in the sensing chamber 302 and the sensing surface 358b senses the pressure of the pressurized fluid at the inlet 210. The pressure sensor 356 moves the flow control member 404 relative to the valve seat 322 based on a pressure differential across the pressure sensor 356 provided by biasing element 368 (on a first side) and the pressurized fluid acting on the effective sensing area provided by the sensing surface 358a in the sensing chamber 302 and the sensing surface 358b adjacent the inlet 210 (on a second side opposite the first side). In particular, a pressurized fluid that imparts a force (e.g., an upward force in the orientation of FIGS. 3, 4A and 4B) to the effective sensing area provided by the sensing surfaces 358a and 358b that is greater than the force imparted by the biasing element 368 to the pressure sensor 356 via the lip 420 (e.g., a downward force in the orientation of FIGS. 3, 4A and 4B) causes the pressure sensor 356 and, thus, the flow control member 404 to slide or move away from the valve seat 322. In turn, the pressure sensor 356 causes, via the engagement of the lip 420 of the flow control member 404 and the shoulder 426 of the retainer 406, the flow control member 404 to move away from the valve seat 322 to allow fluid flow across the orifice 324 of the valve seat 322 between the inlet 210 and the outlet 212 (e.g., an open position).

When the pressure of the pressurized fluid in the sensing chamber 302 and/or inlet 210 imparts a force to the effective sensing area provided by the sensing surfaces 358a and 358b that is less than the force imparted by the biasing element 368, the biasing element 368 causes the pressure sensor 356 to move toward the valve seat 322. In turn, the pressure sensor 356 moves the flow control member 404 into sealing engagement with the valve seat 322 to prevent or restrict fluid flow across the orifice 324 of the fluid flow path 208 (e.g., a closed position). Also, in this example, the pressure sensor 356 and the flow control member 404 are both pressure balanced with the pressure of the fluid at the inlet 210, thereby reducing the amount of spring force of the biasing elements 368 and 408 needed to bias the respective pressure sensor 356 and the flow control member 404.

Unlike conventional valves which include a flow control member integrally formed with a stem portion, the example flow control member 404 is movably coupled relative to the stem 364 via the biasing element 408 to enable the flow control member 404 to move relative to the stem 364 and/or the pressure sensor 356. In this manner, a load imparted by the biasing element 368 to the stem 364 is not fully or directly imparted to the flow control member 404 and/or the valve seat 322 when the fluid regulator 200 moves to a closed position. In other words, the flow control member 404 and/or the valve seat 322 do not fully absorb the load provided to stem 364 by the biasing element 368 when the fluid regulator 200 moves to a closed position.

Instead, the biasing element 408 prevents the flow control member 404 from forcibly engaging the valve seat 322 during pressure fluctuations in the fluid flow path 208 and/or when the fluid regulator 200 moves to the closed position. In other words, the biasing element 408 helps absorb forces imparted to the flow control member 404 and/or the valve seat 322 caused by forcible impacts between the flow control member 404 and the valve seat 322. Substantial pressure fluctuations of the process fluid may cause the flow control member 404 to engage the valve seat 322 with a significant force.

For example, during operation, the biasing element 404 biases the lip 420 of the flow control member 404 toward the shoulder 426 of the retainer 406. However, if the pressure sensor 356 moves toward the valve seat 322 with a forcible impact due to pressure fluctuations in the fluid flow path 208, the biasing element 408 helps absorb forces between the flow control member 404 and the valve seat 322 by allowing the flow control member 404 to travel in a direction away from the valve seat 322 and away from the shoulder 426 during a forcible impact between the flow control member 404 and the valve seat 322 (e.g., opposite the direction of impact or the pressure sensor 356). In other words, the biasing element 408 minimizes a force imparted against the flow control member 404 and/or the valve seat 322 from a force imparted to the stem 364 by the biasing element 368, thereby effectively decoupling the force imparted by the biasing element 368 to the stem 364 or pressure sensor 356 from being imparted to the flow control member 404 and/or the valve seat 322 when the fluid regulator 200 is in the closed position.

As a result, the biasing element 408 prevents or significantly reduces damage to the flow control member 404 and/or the valve seat 322 (e.g., when the valve seat 322 and/or the flow control member 404 are composed of a soft or brittle material such as tungsten carbide), thereby improving sealing and increasing the operating life of the flow control member 404 and/or the valve seat 322. Additionally, the biasing element 408 attenuates movement of the flow control member 404 relative to the valve seat 322 for a range of pressure differentials below a pre-set pressure reference corresponding to the spring rate of the biasing element 368.

Referring to the illustrated example of FIG. 1, the example fluid regulator 200 may be used with the example application 100 in place of the known pressure relief valve 102. For example, the pressure regulator 200 may be fluidly coupled with the process fluid line 118 between the ScSSV 124 and the reservoir 110. The housing 202 of the example back pressure fluid regulator 200 may have an overall outer diameter (OD) of less than, for example, about 2 inches so that it can be disposed inside the tubing 114, while allowing gas/oil to flow around the outer surfaces 218 and 220 of the housing 202 within the tubing 114 from the reservoir 110 to the surface 112.

In this example, a pressure in the process fluid line 118 upstream of the inlet 210 sensed by the sensing chamber 302 that is greater than the pre-set load provided by the biasing element 368 moves the fluid regulator 200 to the open position to allow process fluid 116 to flow between the inlet 210 and the outlet 212. When the pressure of the process fluid line 116 is less than the pre-set load provided by the biasing element 368, the fluid regulator 200 moves to the closed position to prevent fluid flow between the inlet 210 and the outlet 212. The pre-set load provided by the biasing element 368 may be set to a reference pressure that is greater than a pressure required to activate the ScSSV 124. Thus, the pressure sensor 356 senses the pressure of the process fluid 116 at the inlet 210 and moves the flow control member 404 relative to the valve seat 322 based on the pressure of the process fluid 116 upstream of the inlet 210. As a result, the pump 120 may be deactivated and a pressure within the portion 128 of the process fluid line 118 between the fluid regulator 200 and the shut-off valve 126 downstream of the pump 120 may be maintained to a pressure level that prevents activation of the ScSSV 124 during a non-emergency condition or state.

The example regulator body 206, the bonnet 204, the seat retainer 326, the retainer 406, and/or the pressure sensor 356 may be composed of Hastelloy®, stainless steel, metal, plastic and/or any other suitable materials such as, for example, materials that are resistant to erosive or corrosive fluids or conditions. The flow control member 404 and/or the valve seat 322 may be composed of Hastelloy®, ceramic, tungsten carbide, stainless steel, plastic and/or any other suitable materials such as, for example, materials that are resistant to erosive or corrosive fluids or conditions.

Figure 5A:
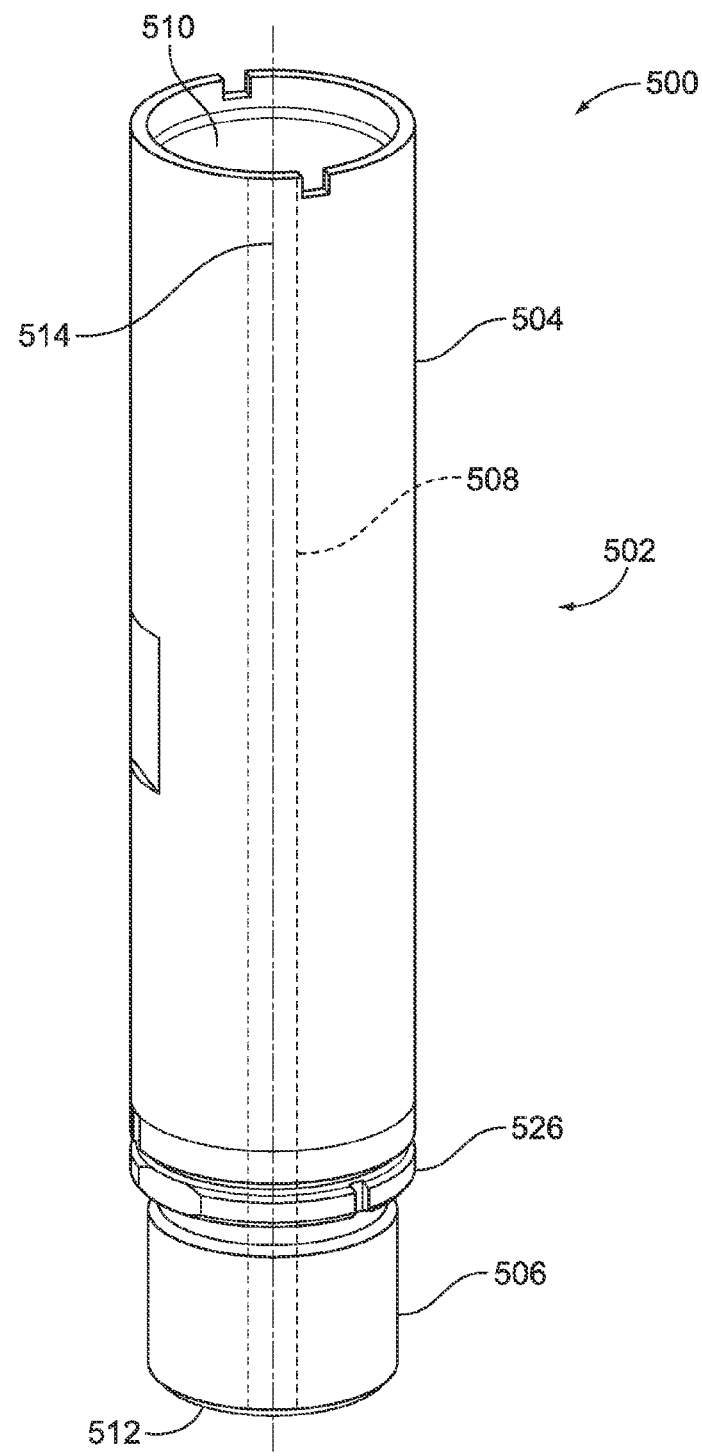
FIG. 5A illustrates another example back pressure fluid regulator described herein.
Figure 5B:
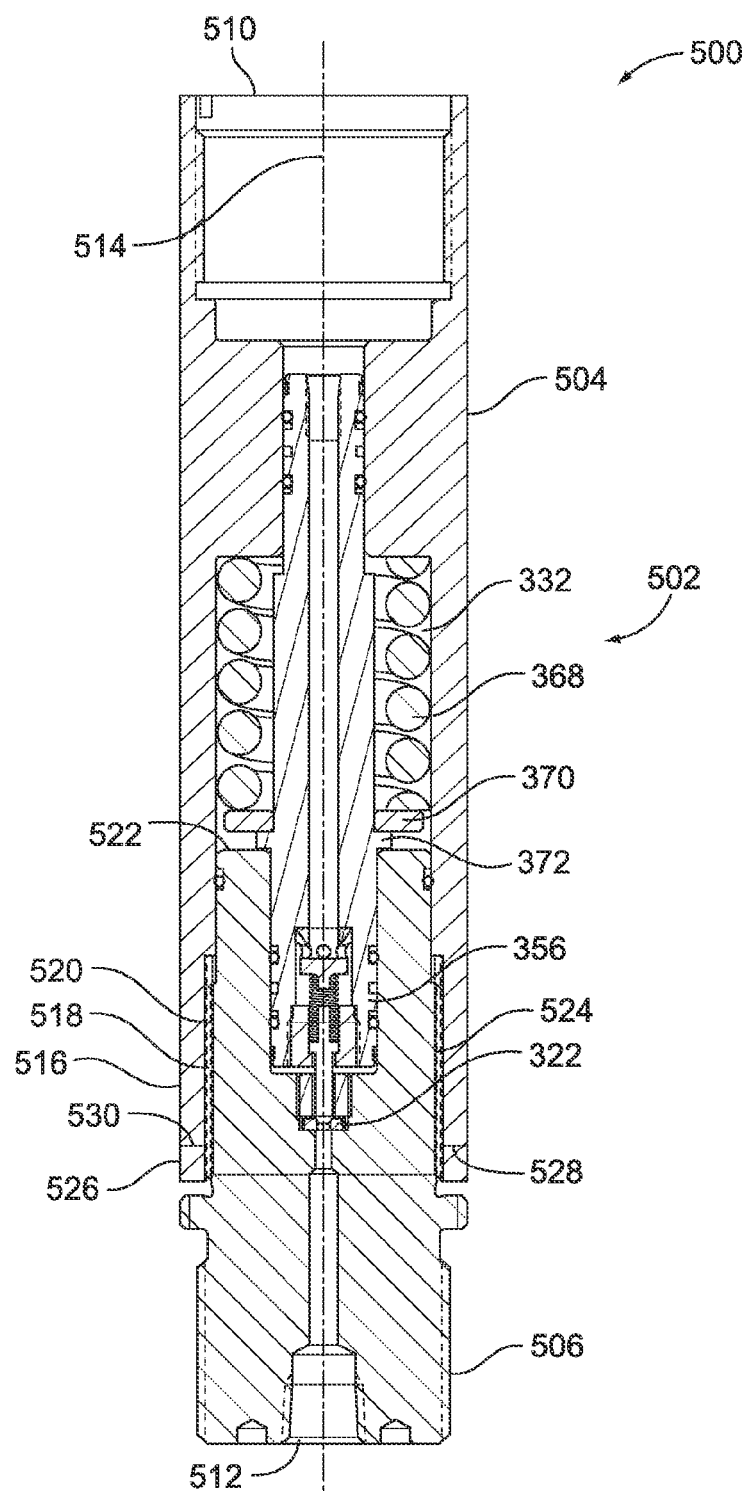
FIG. 5B is a cross-sectional view of the example back pressure regulator of FIG. 5A.

FIGS. 5A and 5B illustrate another example in-line back pressure fluid regulator 500 described herein. Those components of the example fluid regulator 500 that are substantially similar or identical to the components of the example fluid regulator 200 described above and that have functions substantially similar or identical to the functions of those components will not be described in detail again below. Instead, the interested reader is referred to the above corresponding descriptions in connection with FIGS. 2, 3, 4A, and 4B.

In this example, the fluid regulator 500 has a cylindrical housing 502 that includes a bonnet 504 coupled to a regulator body 506 to define a fluid flow path 508 between an inlet 510 and an outlet 512. The fluid flow path 508 is a substantially linear or straight fluid flow path that is aligned with an axis 514 of the housing 502 between the inlet 510 and the outlet 512.

The bonnet 504 includes a first end 516 having a threaded portion 518 to couple to a threaded wall 520 of the regulator body 506. An upper surface 522 of the wall 520 engages a lip portion 372 of a pressure sensor 356. The lip portion 372 engages a spring seat 370 to compress or bias a biasing element 368 in a loading chamber 332. As shown in FIG. 5B, the biasing element 368 is in a fully adjusted state or condition in a direction away from a valve seat 322.

To adjust a reference pressure or pre-set load provided by the biasing element 368, the regulator body 506 is adjusted relative to the bonnet 504. In this example, the regulator body 506 is rotated relative to the bonnet 504 relative to the axis 514 so that a threaded portion 524 of the regulator body 506 moves relative to the bonnet 504 in a direction toward the outlet 512 and parallel to the axis 514. As a result, the upper surface 522 of the wall 520 moves toward the valve seat 322 to enable the biasing element 368 to expand within the loading chamber 332 and, thus, impart a smaller force to the pressure sensor 356.

To lock, hold or maintain the position of the regulator body 506 relative to the bonnet 504, the fluid regulator 506 includes a locking nut or collar 526 disposed between the bonnet 504 and the regulator body 506. The locking nut 526 threadably engages the wall 520 of the regulator body 506 and is positioned relative to the bonnet 504 until an upper surface 528 of the locking nut 526 engages an edge 530 of the bonnet 504.

Figure 6A:
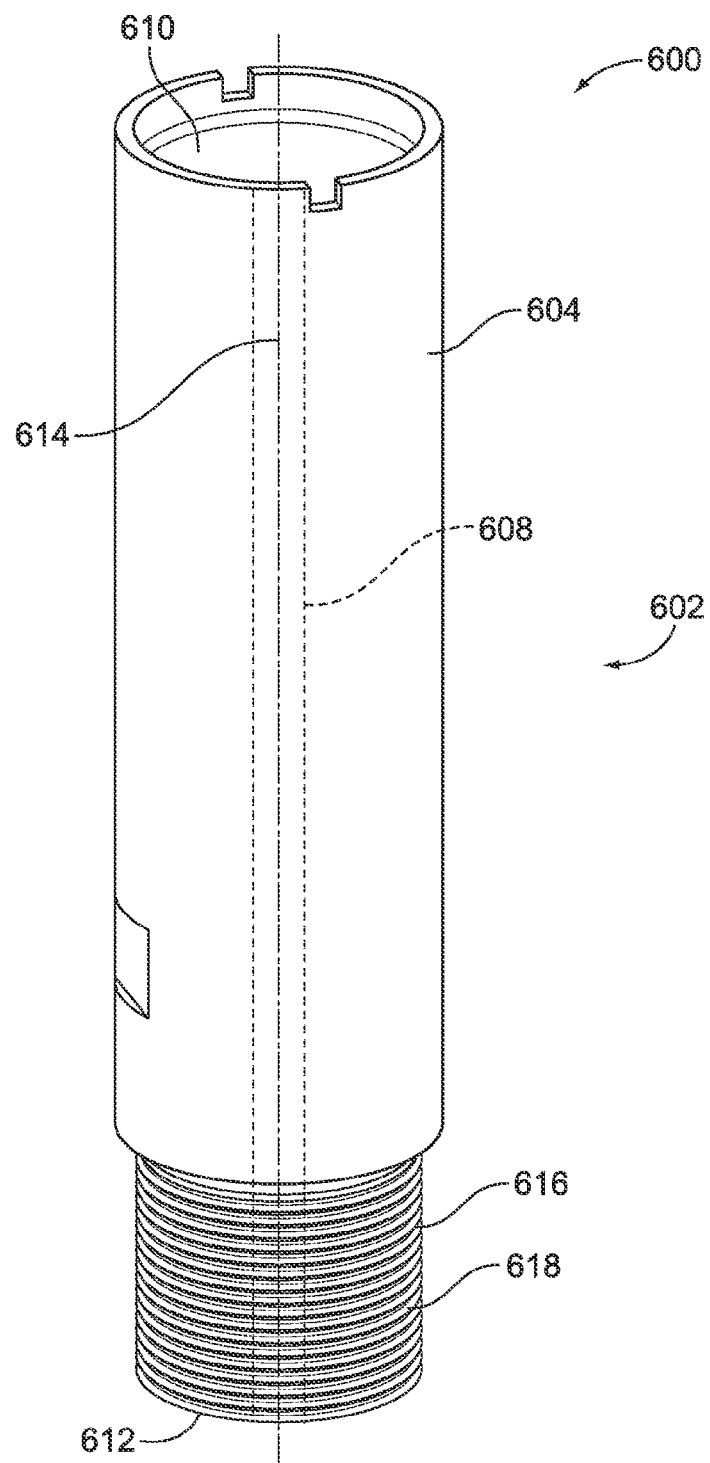
FIG. 6A illustrates another example back pressure fluid regulator described herein.
Figure 6B:
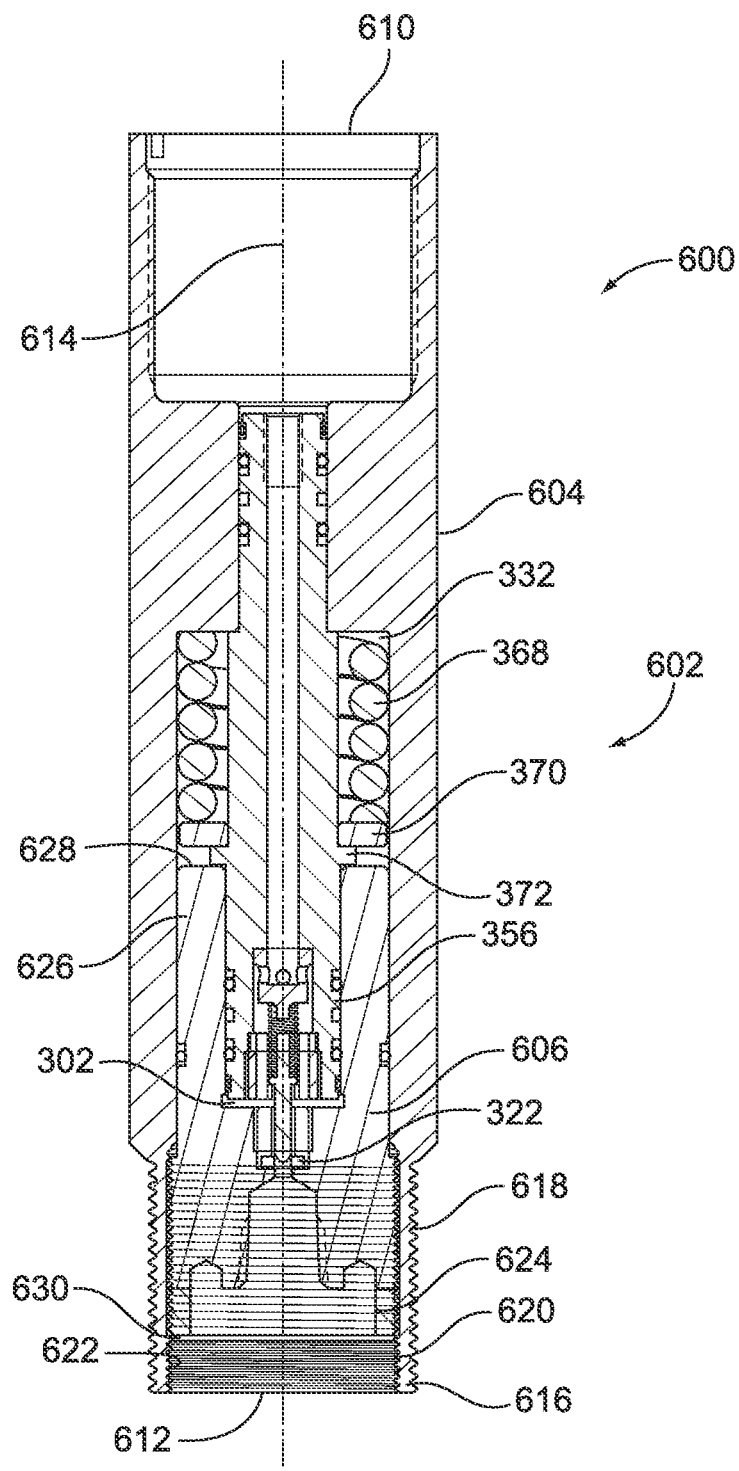
FIG. 6B is a cross-sectional view of the example back pressure regulator of FIG. 6A.

FIGS. 6A and 6B illustrate another example in-line back pressure fluid regulator 600 described herein. Those components of the example regulator 600 that are substantially similar or identical to the components of the example fluid regulator 200 described above and that have functions substantially similar or identical to the functions of those components will not be described in detail again below. Instead, the interested reader is referred to the above corresponding descriptions in connection with FIGS. 2, 3, 4A, and 4B.

In this example, the fluid regulator 600 includes a cylindrical housing 602 having a bonnet 604 coupled to a regulator body 606 (FIG. 6B) to define a fluid flow path 608 between an inlet 610 and an outlet 612. The fluid flow path 208 is a substantially linear or straight fluid flow path that is aligned relative to an axis 614 of the housing 602 between the inlet 610 and the outlet 612.

In contrast with the fluids regulators 200 and 500 described above, the bonnet 604 of the example fluid regulator 600 includes an end 616 having threads 618 adjacent the outlet 612 to couple the fluid regulator 600 to a downstream source (e.g., a downstream tubing or pipe). The end 616 also include threads 620 disposed along an inner surface 622 of the bonnet 604 to receive the regulator body 606. In this example, the regulator body 606 includes threads on an outer surface 624 adjacent the outlet 612. Thus, unlike the regulator bodies 200 and 500 of FIGS. 2, 3, 4A, 4B, 5A and 5B, the regulator body 606 of FIGS. 6A and 6B does not have threads along an annular wall 626 of the regulator body 206 that defines a sensing chamber 302. When coupled to the bonnet 604, the annular wall 626 of the regulator body 606 engages a spring seat 370 and/or the lip portion 372 of the pressure sensor 356. As shown in FIG. 6B, the regulator body 606 is adjusted relative to the bonnet 604 to a fully adjusted state or condition in a direction away from a valve seat 322. Further, unlike the fluid regulators 200 and 500, the regulator body 606 of the fluid regulator 600 is disposed completely within the bonnet 604 adjacent the outlet 612. Thus, the bonnet defines both the inlet 610 and the outlet 612 and the regulator body 606 fluidly couples the sensing chamber 302 and the outlet 612.

To adjust a reference pressure or pre-set load, the regulator body 606 is adjusted relative to the bonnet 604. In this example, the regulator body 606 is rotated relative to the bonnet 604 about the axis 614 so that the regulator body 606 moves relative to the bonnet 604 in a direction toward the outlet 612. As a result, an upper surface 628 of the annular wall 626 moves toward the valve seat 322 to enable the biasing element 368 to expand in the loading chamber 332 and, thus, impart a smaller force to the pressure sensor 356. A locking member 630 (e.g., a locking nut) retains to maintains the adjusted position of the regulator body 606 relative to the bonnet 604.

Although certain apparatus, methods, and articles of manufacture have been described herein, the scope of coverage of this patent is not limited thereto. To the contrary, this patent covers all embodiments fairly falling within the scope of the appended claims either literally or under the doctrine of equivalents.

What is claimed is:

1. An in-line back pressure regulator, comprising:
a regulator body defining a sensing chamber and an outlet of a fluid flow path of the back pressure regulator, the outlet being in fluid communication with the sensing chamber via a first flow passageway in the regulator body;
a bonnet coupled to the regulator body, the bonnet defining an inlet of the fluid flow path and a loading chamber disposed between the sensing chamber and the inlet;
a pressure sensor disposed between the inlet and the sensing chamber, the pressure sensor having a first end defining a first pressure sensing surface in fluid communication with the sensing chamber and a second end defining a second pressure sensing surface opposite the first pressure sensing surface in fluid communication with the inlet, the pressure sensor having a pressure sensor body extending through the loading chamber, the pressure sensor body having an aperture formed between the first end and the second end to define a second flow passageway to fluidly couple the inlet and the sensing chamber; wherein the pressure sensor defines a retainer cavity; and
a flow control assembly received within the retainer cavity, the flow control assembly comprising:
a retainer positioned within the retainer cavity of the pressure sensor, the retainer to define a portion of the first pressure sensing surface of the pressure sensor when the retainer is coupled to the pressure sensor;
a flow control member coupled to the pressure sensor via the retainer, the flow control member to slide relative to the pressure sensor, the flow control member to move relative to a valve seat to control fluid flow through the fluid flow path of the back pressure regulator; and
a guide positioned within the retainer cavity and having a fluid flow guide portion and a spring seat portion, the fluid flow guide to direct fluid flow from the second flow passageway toward the sensing chamber.

2. A back pressure regulator of claim 1, wherein the second flow passageway is coaxially aligned with the inlet and the outlet.

3. A back pressure regulator of claim 1, wherein the pressure sensor comprises a stem.

4. A back pressure regulator of claim 3, wherein a first end of the stem is received by the sensing chamber and a second end of the stem is received within a reduced diameter portion of the bonnet between the inlet and the loading chamber.

5. A back pressure regulator of claim 4, wherein the first end of the stem includes one or more seals to provide a seal between the sensing chamber and the loading chamber, and the second end of the stem includes one or more seals to provide a seal between the inlet and the loading chamber.

6. The back pressure regulator of claim 3, wherein the bonnet includes a bore between a first cavity adjacent the inlet and a second cavity adjacent the loading chamber, wherein the bore has a reduced diameter portion that is less than a diameter of the first cavity and a diameter of the second cavity.

7. A back pressure regulator of claim 1, further comprising the valve seat disposed within the regulator body between the sensing chamber and the outlet to define an orifice of the fluid flow path of the regulator body.

8. A back pressure regulator of claim 1, wherein a first side of the valve seat is in communication with the sensing chamber and a second side of the valve seat is in communication with the outlet.

9. A back pressure regulator of claim 1, wherein the flow control member is to move between an open position at which the flow control member is away from the valve seat to allow fluid flow through the fluid flow path of the back pressure regulator and a closed position at which the flow control member sealingly engages the valve seat to restrict or prevent fluid flow through the fluid flow path of the back pressure regulator.

10. A back pressure regulator of claim 1, further comprising a first biasing element disposed within the loading chamber to bias the pressure sensor toward the valve seat.

11. A back pressure regulator of claim 1, wherein the loading chamber is axially aligned with the fluid flow path of the back pressure regulator.

12. A back pressure regulator of claim 1, wherein the retainer includes an opening to fluidly couple the sensing chamber and the outlet.

13. The back pressure regulator of claim 1, wherein the retainer includes a plurality of openings that are parallel to and radially spaced relative to a longitudinal axis of the regulator body, the openings to fluidly couple the sensing chamber and the inlet.

14. The back pressure regulator of claim 1, further comprising a biasing element positioned between the guide and the flow control member to urge the flow control member toward the valve seat of the pressure regulator.

15. The back pressure regulator of claim 14, wherein the spring seat portion has a profile that is smaller than a profile of the fluid flow guide to form a gap between the spring seat portion and an inner surface of the pressure sensor to enable fluid to flow through the gap and around the spring seat portion such that the stem guide is to divert or direct fluid flow toward the retainer and away from the biasing element.

16. The back pressure regulator of claim 1, wherein the loading chamber is positioned between the inlet and the outlet, wherein fluid at the inlet is to flow to the sensing chamber through the second passageway formed in the pressure sensor that extends through the loading chamber.

17. The back pressure regulator of claim 1, wherein the loading chamber is positioned between an opening of the second passageway in fluid communication with the inlet and an opening in fluid communication with the sensing chamber.

18. The back pressure regulator of claim 1, wherein a first opening of the aperture defining the second passageway is adjacent a first end of the loading chamber and a second opening of the aperture is adjacent a second end of the loading chamber opposite the first end of the loading chamber.

19. The back pressure regulator of claim 1, wherein the loading chamber is sealed relative to the fluid flow path of the back pressure regulator and pressure conditions external to the back pressure regulator to prevent the pressure conditions external from the back pressure regulator from imparting a force to the pressure sensor via the loading chamber that would otherwise increase a pre-set load of the back pressure regulator.

20. The back pressure regulator of claim 19, wherein an interface between the bonnet and the regulator body includes a seal to isolate the loading chamber from the pressure conditions external to the pressure regulator.

21. The back pressure regulator of claim 1, wherein the valve seat is positioned between the outlet and the sensing chamber.

22. An in-line back pressure regulator, comprising:
a body defining a fluid flow passageway between an inlet and an outlet;
a loading chamber formed within the body having a first end adjacent the inlet and a second end adjacent the outlet, the loading chamber being aligned with the fluid flow passageway, the loading chamber being isolated or sealed from environmental conditions external to the pressure regulator to prevent the environmental conditions from affecting a pre-set load of the pressure regulator;
a pressure sensor disposed within the fluid flow passageway and having at least a portion passing through the loading chamber between the first end of the loading chamber and a second end of the loading chamber, the pressure sensor having an aperture through the portion passing through the loading chamber to fluidly couple the inlet and the outlet, the pressure sensor defining a first pressure sensing area and a second pressure sensing area opposite the first pressure sensing area, the pressure sensor having a retainer cavity adjacent the first pressure sensing area, the pressure sensor having a first seal disposed adjacent a first end of the loading chamber to prevent fluid flow between the inlet and the loading chamber and a second seal disposed adjacent a second end of the loading chamber to prevent fluid flow between the loading chamber and the outlet;
a retainer coupled to the pressure sensor via the retainer cavity, the retainer to define at least a portion of the first pressure sensing area when the retainer is coupled to the pressure sensor, the retainer having a channel to fluidly couple the retainer cavity and a sensing chamber in fluid communication with the first pressure sensing area of the pressure sensor;
a flow control member slidably coupled relative to the pressure sensor via the retainer, the flow control member to protrude from the retainer to engage a valve seat of the pressure regulator; and
a guide positioned within the retainer cavity, the guide having an opening to fluidly couple the aperture of the pressure sensor and the retainer cavity.

23. A fluid regulator of claim 22, wherein the sensing chamber is defined between the outlet and the loading chamber.

24. A back pressure regulator of claim 23, wherein the pressure sensor is movable within the fluid flow passageway between a first position and a second position based on a pressure sensed by the first pressure sensing area of the pressure sensor in communication with the sensing chamber and the second pressure sensing area of the pressure sensor in communication with the inlet.

25. A back pressure regulator of claim 24, wherein the pressure sensor is to move relative to a valve seat disposed within the fluid flow passageway to control fluid flow between the sensing chamber and the outlet.

26. A back pressure regulator of claim 22, wherein the pressure sensor is to move the flow control member relative to a valve seat to control fluid flow through the fluid flow passageway between the sensing chamber and the outlet based on a pressure of a fluid in the sensing chamber.

27. A back pressure regulator of claim 22, wherein the body comprises a regulator body coupled to a bonnet, wherein the bonnet defines the inlet and the regulator body defines the outlet.

28. The back pressure regulator of claim 22, wherein the first pressure sensing surface is oriented toward the sensing chamber.

29. The back pressure regulator of claim 22, wherein the first end defining the first pressure sensing surface is in fluid communication with the sensing chamber and the second end defining the second pressure sensing surface opposite the first pressure sensing surface is in fluid communication with the inlet.

30. A fluid regulator of claim 22, wherein the flow control member protrudes from the first end of the pressure sensor and the retainer to sealingly engage the valve seat positioned within the fluid flow passageway of the regulator body when the regulator is in a closed position.

31. An in-line back pressure regulator, the regulator having a body to define a fluid flow passageway between an inlet and an outlet, comprising:
   means for controlling fluid flow within a fluid flow passageway of the regulator between an inlet and an outlet, wherein the fluid flow passageway of the regulator and the inlet and the outlet are axially aligned;
   means for sensing having a first face to sense a pressure of a fluid in a sensing chamber and a second face opposite the first face to sense a pressure of a fluid at the inlet, the means for sensing being disposed between the inlet and the outlet and extending at least partially through a loading chamber of the regulator, the means for sensing having means for allowing fluid flow between the first face and the second face to partially define the fluid flow passageway to fluidly couple the inlet and the outlet, the means for sensing having a retainer cavity;
   means for retaining the means for controlling fluid flow to the means for sensing, the means for retaining configured to enable the means for controlling fluid flow to slide relative to the means for sensing, the means for retaining defining at least a portion of the first face of the means for sensing when the means for retaining is coupled to the means for sensing, the means for retaining having means for fluidly coupling the retainer cavity and the sensing chamber;
   means for guiding positioned within the retainer cavity, the means for guiding having means for fluidly coupling the means for allowing fluid flow of the means for sensing and the sensing chamber;
   means for urging the means for controlling fluid flow, the means for urging positioned within the retainer cavity between the means for guiding and the means for controlling fluid flow, at least a portion of the means for urging being partially positioned within an aperture of the means for retaining;
   means for loading the means for sensing the pressure, the means for loading being aligned with the fluid flow passageway between the inlet and the outlet and surrounding at least a portion of the means for sensing; and
   means for sealing the means for loading from the fluid flow passageway and wherein a pre-set load of the pressure regulator is not affected by environmental conditions external to the pressure regulator.

\* \* \* \* \*